United States Patent [19]
Wolters, Jr. et al.

[11] Patent Number: 5,826,252
[45] Date of Patent: Oct. 20, 1998

[54] SYSTEM FOR MANAGING MULTIPLE PROJECTS OF SIMILAR TYPE USING DYNAMICALLY UPDATED GLOBAL DATABASE

[75] Inventors: Richard Arthur Wolters, Jr., San Jose; Susan Mae Schwee, Scotts Valley, both of Calif.; James Russell Isaacs, Zurich, Switzerland; Michael Adrian Smith, San Jose, Calif.; Walter Hening Cooley, Jr., Pacific Grove, Calif.; Craig Ernest Leighty, Pleasanton, Calif.; George Borst, Morgan Hill, Calif.; Paul Lawrence Mayo, San Jose, Calif.; Gregory Douglas Lownes, Exton, Pa.

[73] Assignee: General Electric Company, San Jose, Calif.

[21] Appl. No.: 671,999

[22] Filed: Jun. 28, 1996

[51] Int. Cl.$^6$ ..................................................... G06F 17/30

[52] U.S. Cl. ...................... 707/1; 707/1; 707/2; 707/102; 707/201; 706/45; 705/7; 705/1; 395/500

[58] Field of Search ............................ 707/1, 7, 10, 104, 707/2, 6, 102; 705/1, 8, 7; 706/45

[56] References Cited

U.S. PATENT DOCUMENTS 5,548,506  8/1996  Srinivasan ........................... 364/401 R
5,581,749  12/1996  Hossain et al. ......................... 395/600
5,692,157  11/1997  Williams ................................. 395/500

Primary Examiner—Thomas G. Black
Assistant Examiner—Srirama Channavajjala
Attorney, Agent, or Firm—James E. McGinness; Dennis M. Flaherty

[57] ABSTRACT

A system for managing multiple projects of a similar type has a global project management database for storing data for all participating projects which is dynamically updated with best current data representing best current practices across all participating projects in the system. Localized computer terminals are operated at each local site with a common project management program and data imported from the global project management database. Periodically, the local terminals export data to the global project management database which are evaluated to determine any new best current practices across all participating projects and to update the global project management database with the new best current practices. Upon periodically importing data from the global project management database, each localized computer terminal is updated with the new best current practices across all participating projects.

20 Claims, 8 Drawing Sheets

MICROSOFT ACCESS

File

PATH SETUP/UPDATE

| STATUS | INSTALL | UPDATE | REMOVE | DESCRIPTION | CURR REV | DATE | SIZE (KB) |
|---|---|---|---|---|---|---|---|
| INSTALLED | ☐ | ☐ | ☐ | PATH RELEASE 2 | 2.03 | 12/27/95 | 905 |
| INSTALLED | ☐ | ☐ | ☐ | PATH HELP | 1.01 | 12/29/95 | 524 |
| INSTALLED | ☐ | ☐ | ☐ | GENERAL INFORMATION (SERVICES DIRECTORY OF GENE INFORMATION) | 1.00 | 11/13/95 | 147 |
| OLD | ☐ | ☒ | ☐ | WHO 2 CALL (PHONE, FAX, PAGER, ETC. FOR KEY PERSONNEL) | 2.02 | 03/01/96 | 413 |
| OLD | ☐ | ☒ | ☐ | PROJECT AND PROPOSAL PATH MASTER-SERVICES (ITEMS AND REFERENCE FILES) | 1.02 | 04/01/96 | 4,334 |
| | ☐ | ☐ | ☐ | PROJECT AND PROPOSAL PATH MASTER-FUELS (ITEMS AND REFERENCE FILES) | 1.00 | 11/29/95 | 0 |
| | ☐ | ☐ | ☐ | PROJECT AND PROPOSAL PATH MASTER-NUCLEAR PLANT PROJECTS (ITEMS AND REFERENCE FILES) | 1.00 | 11/29/95 | 0 |
| | ☐ | ☐ | ☐ | PROJECT AND PROPOSAL PATH MASTER-REUTER STOKES (ITEMS AND REFERENCE FILES) | 1.00 | 11/29/95 | 0 |
| INSTALLED | ☐ | ☐ | ☐ | CODES, STANDARDS AND REGULATIONS | 1.00 | 11/13/95 | 82 |
| INSTALLED | ☐ | ☐ | ☐ | PEOPLE DATABASE | 1.01 | 11/17/95 | 205 |
| INSTALLED | ☐ | ☐ | ☐ | PROCESSES & TOOLS-PROPOSAL PROCESS | 1.00 | 11/17/95 | 500 |
| INSTALLED | ☐ | ☐ | ☐ | PROCESSES & TOOLS-PWR PROPOSAL POLICY | 1.00 | 11/17/95 | 33 |
| INSTALLED | ☐ | ☐ | ☐ | PROCESSES & TOOLS-TEAMWORK, LEADERSHIP & MEETINGS | 1.01 | 11/17/95 | 672 |
| OLD | ☐ | ☒ | ☐ | PROCESSES & TOOLS-TERMS & CONDITIONS PROCESS | 1.60 | 03/13/96 | 508 |
| INSTALLED | ☐ | ☐ | ☐ | CUSTOMER-AMERICAS | 1.00 | 11/16/95 | 213 |
| INSTALLED | ☐ | ☐ | ☐ | CUSTOMER-ASIA | 1.00 | 11/16/95 | 49 |
| INSTALLED | ☐ | ☐ | ☐ | CUSTOMER-EUROPE | 1.00 | 11/16/95 | 111 |
| | ☐ | ☐ | ☐ | POLE-BWR-AMERICAS-BOSTON EDISON CO (BECO)-PILGRIM 1 | 1.00 | 12/07/95 | 287 |

FREE DISK SPACE 16,933 KB
NEEDED DISK SPACE 0 KB
REMAINING DISK SPACE 16,933 KB

[PROCESS CHANGES AND EXIT PATH SETUP]
[EXIT PATH SETUP WITH NO CHANGES]
[MARK ALL OLD ITEMS FOR UPDATES]
[MARK ALL INSTALLED ITEMS FOR REMOVAL]
[MARK ALL BASELOAD ITEMS FOR INSTALLATION]

FIG. 5

GENE PATH
LESSONS LEARNED AND SUGGESTIONS

LESSONS LEARNED AND SUGGESTIONS

REPORT TO OWNER OR ADMINISTRATOR (NOT PATH CENTRAL)

TITLE OF REPORT:

DETAIL OF PROBLEM:

DETAIL OF LESSONS
OR SUGGESTION:

PROJECT:

UTILITY: ▼ PLANT

PRIORITY BY ORIGINATOR: ◀

REPORTED BY: DATE

MAIL TO:

MAIL CC:

ANY MS MAIL ADDRESS THAT YOU ENTER FOR MAIL TO OR CC WILL BE VALIDATED OR CAN BE CHANGED IN THE MS MAIL SCREEN THAT FOLLOWS AFTER PRESSING THE SEND BUTTON

[SEND]        [CANCEL]

FIG. 6

PATH FEEDBACK

USE "PATH FEEDBACK" TO SEND COMMENTS TO THE PATH COUNCIL

TITLE OF FEEDBACK:

DETAIL OF FEEDBACK:

EFFECT ON PATH:

PART OF GLOBAL PATH:

PRIORITY BY ORIGINATOR:

REPORTED BY:

DATE:

MAIL TO: PATH CENTRAL

MAIL CC:

ANY MS MAIL ADDRESS THAT YOU ENTER FOR MAIL TO OR CC WILL BE VALIDATED OR CAN BE CHANGED IN THE MS MAIL SCREEN THAT FOLLOWS AFTER PRESSING THE SEND BUTTON

SEND     CANCEL

GENE PATH — PATH FEEDBACK

FIG. 7

SYSTEM FOR MANAGING MULTIPLE PROJECTS OF SIMILAR TYPE USING DYNAMICALLY UPDATED GLOBAL DATABASE

FIELD OF THE INVENTION

This invention relates to a system for managing the planning and performance of multiple projects of a similar type, and particularly to such a system using a dynamically updated global database accessed by project participants of the system for their respective localized projects.

BACKGROUND ART

A project typically requires planning for and performing a multitude of individual steps or tasks within a given timeline. Such tasks may have associated therewith a plethora of reference data, documents, specifications, communications, etc. generated and used in a complex project. If a vendor of project management services undertakes a multitude of projects of a similar type, it is desirable to transfer the lessons learned and best practices developed in prior projects to new or ongoing projects. It is also desirable to systematize project planning and documentation across all projects so that services of uniform high quality and integrity can be delivered.

For example, in project management involving nuclear power plants, it is desirable for the vendor of project management services to carry over reference data, documentation, and best practices developed on previous projects into new or ongoing projects such as construction of a nuclear power plant, or performance of a refueling and maintenance outage. Projects of a similar type should use a similar planning methodology and task lists for performance, refer to the same regulations and specifications of applicable government agencies, suppliers, and contractors, and employ much of the same forms and other documentation. Each project also has individual localized characteristics, such as its siting, capacity, customer requirements, etc., and often valuable lessons are learned or best practices are developed in the course of performing a particular project that could be shared with other projects.

In conventional practice, a vendor typically standardizes an approach to project planning and performance and trains its project managers and employees accordingly. Once a project team is assigned to work on a particular project, however, many individual practices and decisions are taken on a daily basis, and project activities, data, and documentation tend to be generated and used locally. This localization of project activities tends to isolate similar projects from each other and inhibits the sharing of information and standardization of practices across all projects. Promoting communication between projects or sharing files and documents from a conventional database via a network would not completely overcome the problems of localization since each project is likely to be performed or documented in different ways from each other.

SUMMARY OF THE INVENTION

It is therefore a principal object of the invention to provide a system for managing multiple projects of a similar type which would allow common reference data, documentation, best practices, etc. to be used across all projects. It is a specific object that such common reference data, documentation, best practices, etc. be updated dynamically from all projects and used locally at each participating project.

In accordance with the present invention, a system for managing multiple projects of a similar type comprises:

(a) a global project management database for storing data for all projects participating in said system, said database being maintained and updated dynamically with best current data representing best current practices across all participating projects in said system;

(b) a plurality of localized computer terminals, each having a microprocessor for executing a project management program for a participating project associated with each said terminal at a respective local site and a memory for storing and retrieving data obtained from said global project management database for use in the project management program at the respective local site;

(c) data access means operative between said global project management database and each one of the localized computer terminals for periodically importing data from said global project management database, including best current data across all projects, for use in the participating projects, and for periodically exporting data from the participating projects to said global project management database; and (d) updating means operative in conjunction with said global project management database for allowing evaluation of said data periodically exported from the localized computer terminals of the participating projects, determining whether any such data constitutes new best current practices across all participating projects, and updating the best current data of said global project management database with the data determined to constitute new best current practices across all participating projects, said new best current practices then being imported by the localized computer terminals from said global project management database, whereby said global project management database is updated dynamically with best current data representing new best current practices across all participating projects of said system, and the localized computer terminals import and use the new best current practices at the respective participating projects.

In a preferred embodiment of the invention, the above-described system maintains best current lists of plans, inputs, documents, practices, critical success factors, etc. across all projects at the global project management database. These best lists are loaded in the localized computer terminals during periodic data import cycles for use by the participating projects at their local sites. Reports on lessons learned or improved practices developed at any local site are exported to the global database for review by a mission review group and added to the best lists maintained at the global database if determined to represent a best current practice across all sites. The reports may be exported to the global database as a separate communication or included in a project data export cycle. In a system employing stand-alone or portable computers as localized terminals, data import and export may be performed by exchange of data storage media on a periodic basis. In a system employing localized terminals connected to a network, data import and export may be performed during log on/off cycles.

The preferred system employs a uniform directory and file structure and a common project management program for the global project management database and localized computer terminals. The project management program is used at the local sites as a list manager for the best lists obtained from the global database, and its on-site functions include file management, revision control, creating links to reference data and documents, report preparation and handling, and data import/export. The common project management program is operable in a Project Planning Mode and a Project Performance Mode.

As a specific feature of the invention, when the local terminals are to import best current data from the global database, a revision control procedure is performed. When new best lists containing new best current practices are obtained from the global database for a local project which is in process, the new best current practices are merged into the lists of the local project using a Combine function that carries over the best current practices already performed at the local site and adds the new best current practices which remain to be performed. In this manner, new best current practices gained from widely dispersed projects are made available to a local project on a dynamic basis, and a record of the best current practices actually performed at the local project is maintained.

Other objects, features and advantages of the present invention are described in further detail below, with reference to the following drawings:

BRIEF DESCRIPTION OF THE DRAWINGS

FIG. 5 illustrates a pre-formatted utility for the Setup/Update procedure for updating the project management program at local sites.

FIG. 6 illustrates a pre-formatted utility for reporting Lessons Learned at a local site.

FIG. 7 illustrates a pre-formatted utility for reporting Feedback from a local site.

DETAILED DESCRIPTION OF A PREFERRED IMPLEMENTATION

The following is a detailed description of a preferred implementation of the system of the present invention. In this implementation, a refueling and maintenance outage at a nuclear power plant is used as an example of a project of similar type which is planned and performed at dispersed local sites using a dynamically updated global database. It is to be understood that the invention is equally applicable to a wide range of other types of projects which have the characteristic of being of similar type but performed by different participants at different locations.

System Architecture

Figure 1:
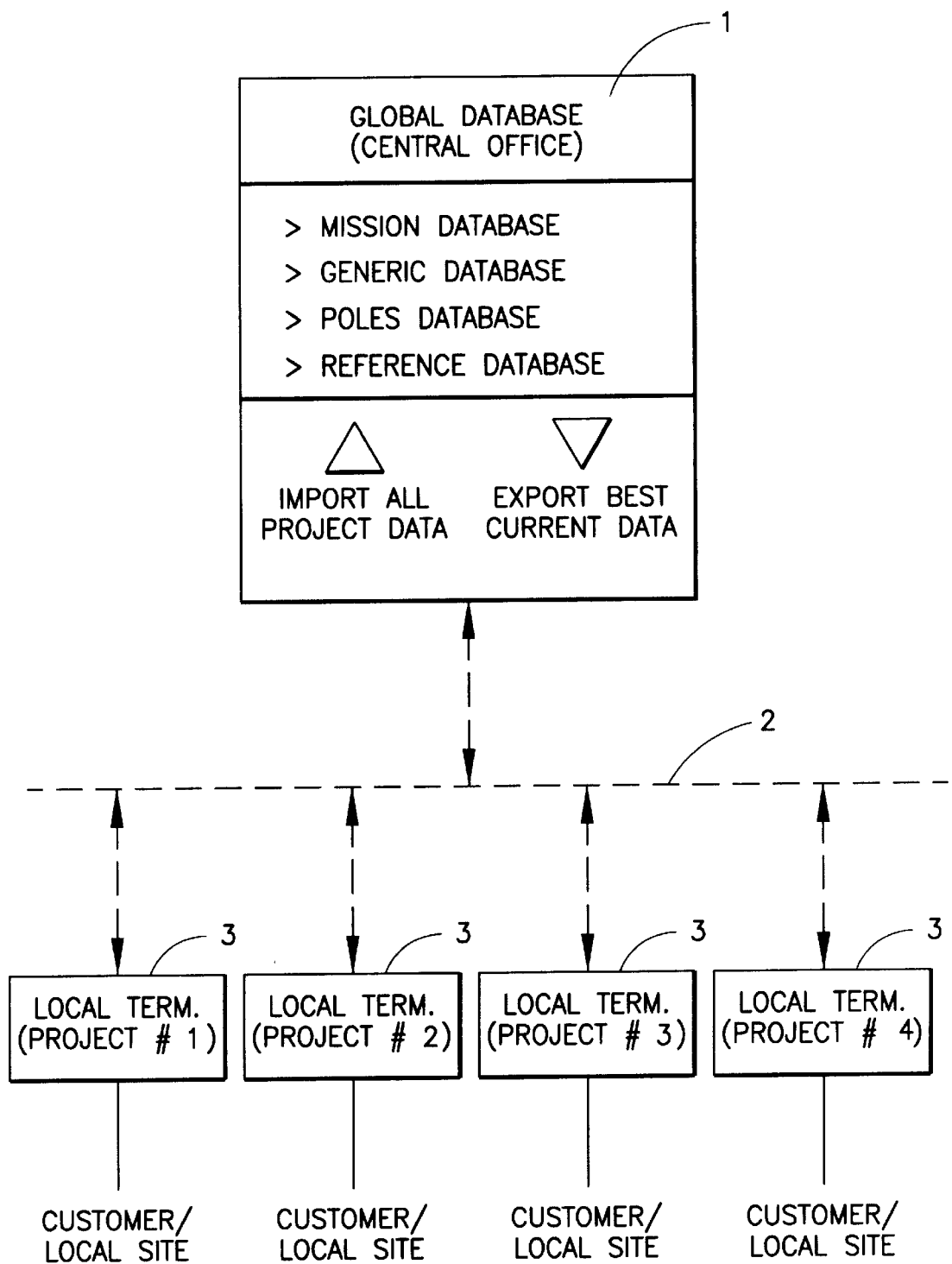
FIG. 1 is schematic diagram of the overall architecture for a system for managing the planning and performance of multiple projects of a similar type in accordance with the present invention.

Referring to FIG. 1, the overall architecture for a multi-project system is illustrated. A global database 1 is maintained by a project management services vendor to store all of the data used by the system. The global database 1 is used (accessed) by a plurality of localized computer terminals 3 each of which is associated with a participating project being carried out for a customer at a respective local site. Each local terminal is used by participants of the project management team assigned to the local site. Each project is planned for or contracted with a customer, i.e., an electric utility company, responsible for the project to be performed at the local site.

The global database 1 may be maintained, for example, on a workstation or server at a central office of the project management services vendor. The local terminals 3 may be standalone or portable computers or computer terminals connected by a network to the central server. The local terminals have a microprocessor for executing a common project management program used by the system and mass memory for storing data obtained from the global database 1 as well as data generated and/or used locally. Data is shared (imported/exported) between the local terminals and the central database 1 via a data transfer connection 2 which may be a WAN or LAN network, an e-mail or file transfer connection, or physical exchange of data storage media.

A project management program is used to operate the global database 1 in common with the local terminals 3. Since a common program is used, all local sites send/receive and maintain their project information in a common format and with complete file compatability with the vendor's central server and with all other project sites. This provides a central functionality to the system to manage projects of a similar type. Information on best current practices and lessons learned can be gathered (exported) dynamically at the central server from all local projects of a similar type, and then shared among all local projects (imported) through a local-site program updating procedure to be described in further detail below.

The common project management program is preferably written as a customized application of a conventional database program which will run on servers, PCs, and laptops alike, for example, MS Access™ 2.0 for Windows 3.1 or DOS 6.0 sold by Microsoft Corp., of Redmond, Wash. The program interface allows a user to select program databases and display lists which are stored in tables within the program databases. The lists can have pointers to project files and reference files which are stored in the uniform directory and file structure imported from the database. The program allows the user to create, add, edit, and delete items from the lists, and to generate, import, and export documents, reports, and other files. The program encompasses list management functions and database management functions.

At the central server, the project management program is used to maintain the global database 1 including the following components:

(1) Mission Database stores project data exported from each of the participating projects of the system, as well as best current data obtained and evaluated across all projects of the system. Participating projects include similar projects already completed and those being planned or in the process of being performed, as well as projects of other types grouped according to similar type. Best current data include lists of plans, tasks, documents, practices, critical success factors, etc. determined to constitute best current practices across all projects.

(2) Generic Database stores data for the project management services vendor which is usable by any participating project, for example, form documents, contracts, sales information, and equipment specifications.

(3) Poles Database stores customer data and site specific data applicable to the participating projects.

(4) Reference and Other Databases store reference data usable by any participating project of the system. Such reference data can include, for example, applicable codes, standards, and regulations, documents, and common lists or processes usable in any project.

Program Organization

Figure 2:
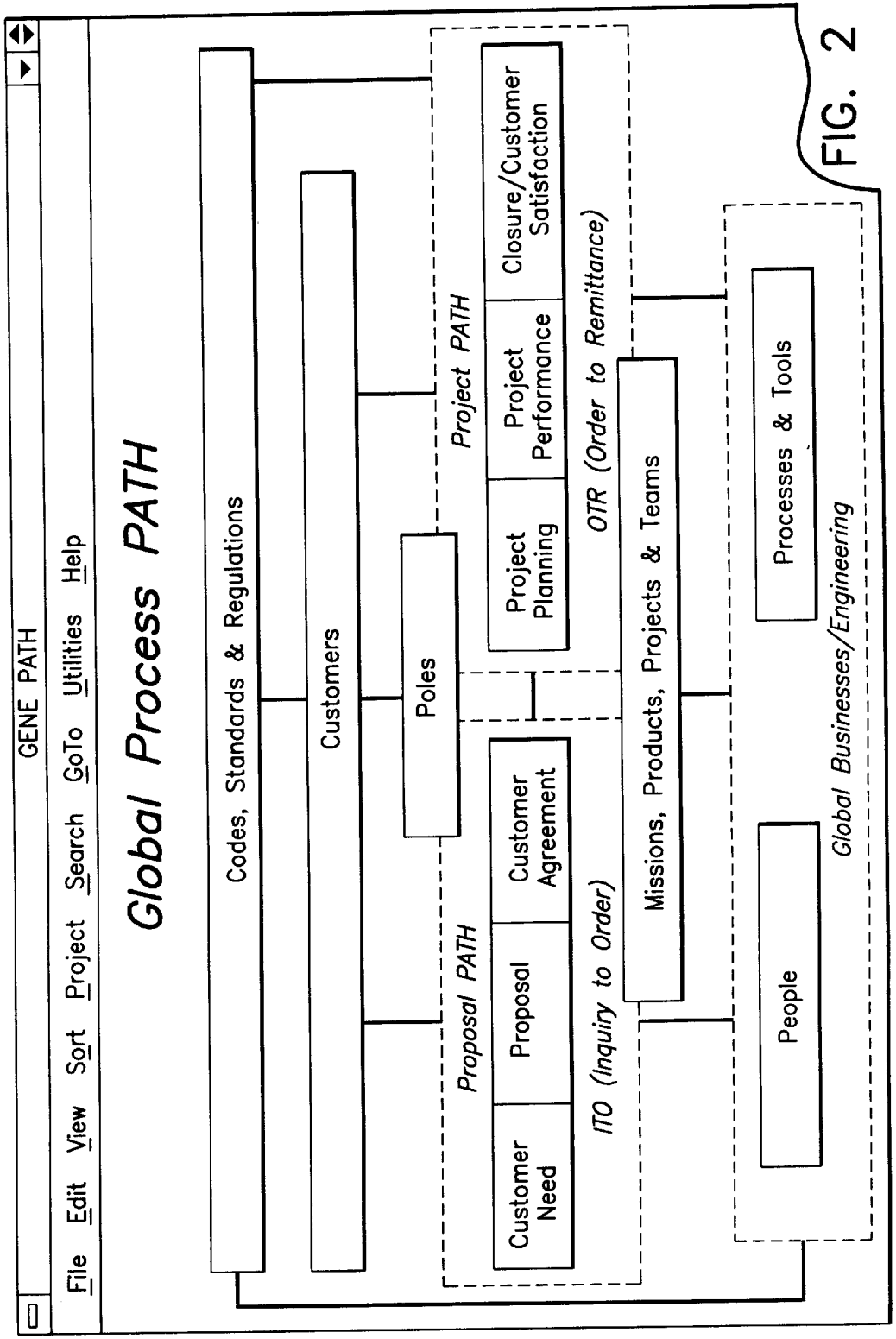
FIG. 2 illustrates the user interface for the project management program.

FIG. 2 illustrates the main screen display of the user interface for the example of the project management program as used for construction and maintenance projects of similar type at multiple nuclear plant sites maintained by a nuclear services vendor (referred to by the applicant as the PATH™ program). The buttons in the display represent various modules of the global database 1. For this specific application, the database modules are broken down into the following groupings:

1. Codes, Standards & Regulations
2. Customers (customer-specific data)
3. Poles (site-specific data)
4. Model: Proposal PATH (project proposals) Mode 2: Project PATH (project tracking)
5. Missions, Products, Projects & Teams (business-specific data)
6. People (correspondence data)
7. Processes & Tools (commonly used file procedures)

The main interface includes pull-down menus for functions that can be performed with respect to the modules of the global database. These are described briefly below.

The File menu provides functionality to exit the PATH application, close windows, set program configuration, and print and send reports. Program configuration controls how often "Critical Success Factors" are displayed on startup, and the LAN drive letter used for opening Mission and Pole Databases while connected to the LAN. The print and send function also includes print preview and print setup functions. The print functions allow paper printouts. The send function provides the ability to send information via MS Mail system to other project members.

The Edit menu provides data editing, checklist item and attachment maintenance, and project file linking functionality. Data editing is supported by Undo, Cut, Copy and Paste menu items. Checklist item and attachment maintenance is supported by Add and Delete menu items. Project file linking is support by an Add and Delete link function.

The View menu provides selection for checklist items, attachments, and project files. Checklist items can be selected on Applicability, Planned or Closed. Attachments, which are associated with a Checklist item, can be selected on the type of file (reference files, or project specific files), or can present all attachments across all project. Project files are selected by the phase (three phases of proposal, and the single project execution phase) of the project.

The Sort menu provides optional functions for indexing of project files.

The Project menu provides the functions to select different projects, change project specific information, and maintain projects within PATH. Since PATH stores multiple projects, a selection feature allows the changing between projects. Project specific information means project title, charge numbers, manager names, customer, site, start and end dates, order amount and comments. Maintenance of projects includes:

Create New Project. This creates new projects from Project Master Templates or existing projects.

Combine Projects. This features combines projects together to create a new project (explained in detail below).

Delete Project. This deletes a project and related information.

Import Projects. This imports project data files, created with the PATH Export.

Export Projects. This menu item exports all related project data, including project information, checklist items, attachments and project files together into one file, which can be easily transmitted between users (via floppy disk, network or mail system).

The Search menu provides the functions to filter and select both checklist items and attachments (reference and project files).

The Go To menu allows a jump to all the data provided by the Global PATH screen, in addition to Critical Success Factors and several key processes, from any of the PATH screens.

The Utility menu provides three key communication tools:

Send PATH Feedback. This standardizes the process and format used to transmit ideas from the user back to designers and maintainers of PATH (explained in detail below).

Send Lessons Learned Report. This standardizes the process and format used to transmit Lessons Learned back to Business or Process owners (explained in detail below).

Send Competitive Information. This standardizes the format used to transmit Competitive Information back to a central source who is responsible for collecting, evaluating and disseminating to the appropriate people.

The Help menu provides on-line content sensitive help for using and understand how to use PATH. In addition, Who2Call lists help project teams know where to go for information.

Use of the common Project PATH file structure provides standard filing convention and information structure for all members of a Project Team. Communication of information to Project Team members can be exported or linked to other geographic locations electronically. This information can originate from individual local data bases, from the central active file database, from an archieval file of a previous project maintained on a central database, or from another related project on a local database. Export of files are easily made via attachments to standard MSMAIL using existing available software.

All project files created for the current project are shown within the Project Performance section of Project PATH. The system PATH is structured to keep track of all files opened for this specific project and stores these filenames and their directory structure in one location for ease of retreival. PATH links these files and directories to other systems in the Windows environment for use with other databases or to communicate to Team members. Those tasks/files which have not been closed/completed are automatically linked to the Closure section of PATH. Completion of the task/file is necessary before the project is done/closed out. Since PATH keeps account of the open items/issues during the project, it is unnecessary to manually keep track of the tasks.

Reference data linking is implemented by storing the name of the reference or project specific data file in the database. When the file is opened within PATH, the application associated with the data file is launched, and the file is loaded.

When any given project is to be initiated, copies of the project management program and those portions of the component databases applicable to the project are exported or copied from the global database 1 and installed on a local terminal 3 which will be used for managing the local project. These programs and component databases are primarily in the form of common-format master lists, data files, and references. The project management program is first operated in a Project Proposal mode (Proposal PATH). The user starts with a set of best lists loaded with the best current data, then selects, edits and customizes them to specify the tasks and other parameters for the project that meet the customer's requirements.

Upon acceptance by the customer, the proposal lists are then used in the Project Performance (Project PATH) mode where they are tracked by the program to guide the performance of the project. Reference files are stored upon installation in a pre-defined directory structure matched to the one used in the global database. Project files are grouped together locally in a project directory.

List Management

Figure 3:
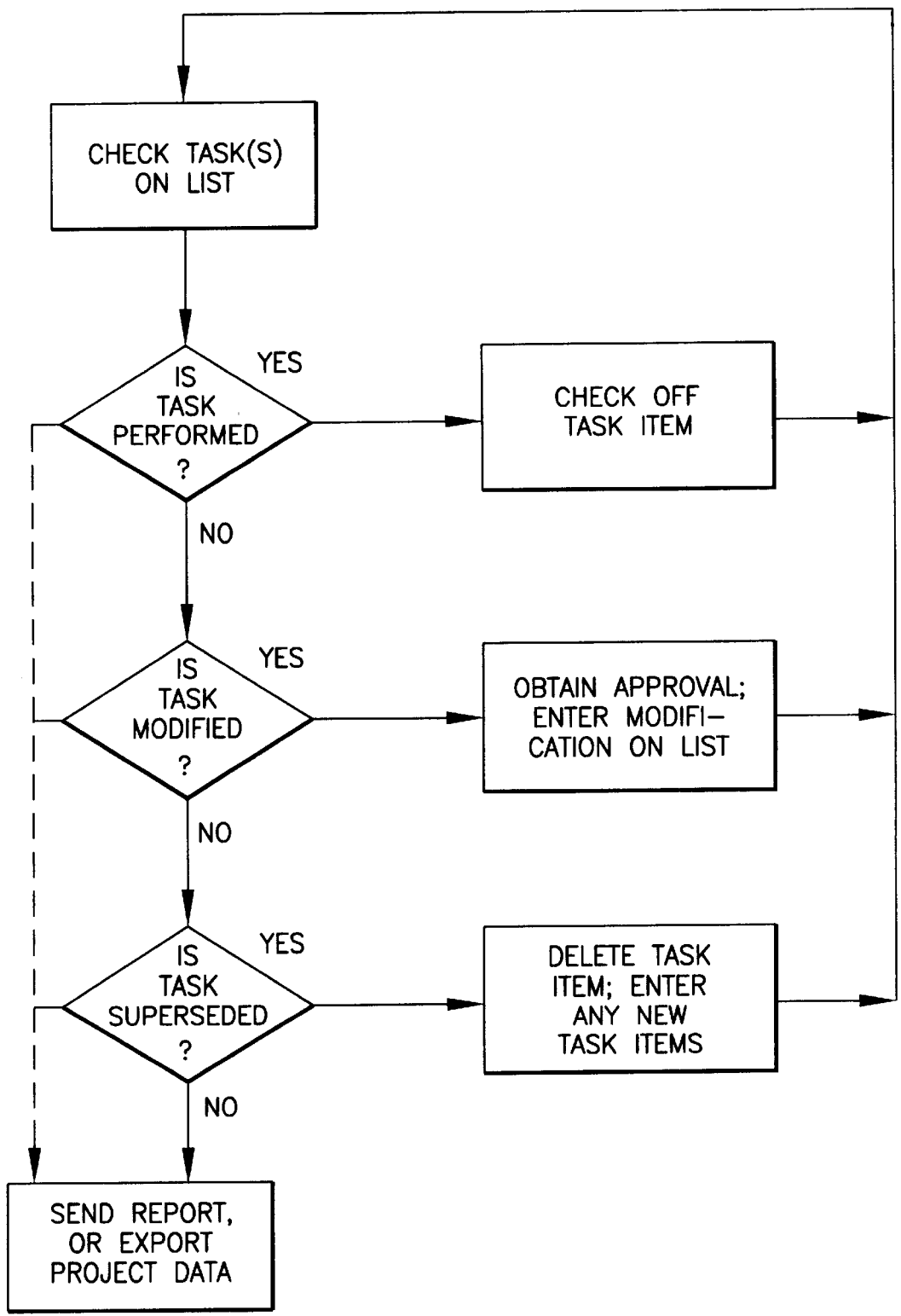
FIG. 3 is a schematic diagram of a basic procedure for list management in the project management program.

In this example of a project management program, the system carries out its project tracking functions essentially by list management. A basic sequence for management of a typical list of tasks representing any task component of the overall project is illustrated in FIG. 3. As the project task component is performed, the tasks on the list are checked by the project manager and members of the project team. If a task is performed, it is so noted on the list. If a task is modified locally, approval is obtained from the customer and the vendor supervisory group and the modified task is entered on the list. If a locally modified task is superceded, it is deleted from the list and a new task item may be entered. Checklist items that originate from a Master Template from the Global Database are not permitted to be modified or deleted from the list. If a master template item is to be superceded, the item is marked "not applicable", then a new item can be added at the discretion of the project manager. At the completion of the project, new items are reviewed by the vendor supervisory group.

Periodically, the site-specific project lists and related project files are exported from the local terminal 3 to the global database 1 where they can be reviewed and the progress of the project can be monitored by a project supervisor. If the site-specific data includes a result which is deemed to be a new best practice or lesson learned or new information, the project manager may send a report to the central office or include a notation with the project data exported to the global database in order to call the attention of the project supervisor to review this new information.

The project data exported or reported to the global database are stored as project-specific files. The project files reviewed by a project supervisor, and any significant new best practices, lessons learned, or new information are forwarded to or noted for technical review by a mission review group. If the mission review group determines the reported practice to be a new best current practice for all participating projects, the best current data of the global database is updated to reflect the new best current practice and a new revision number is assigned to the project management program which includes the corresponding data.

Revision Control Procedure

A central function of the project management system in accordance with the present invention is the program updating procedure performed periodically at the local sites to obtain the most current (new) best practices, lessons learned, and other project information gathered at the central server's database. For the PATH Project example described herein, the program updating procedure is implemented through a Revision Control procedure executed by a user at a local terminal. The Revision Control procedure can be initiated automatically for networked systems whenever a terminal logs on to the network with the central server. Alternatively, for standalone terminals, such as PC's and portable computers, project managers at the local sites can install updated versions of the project management program at periodic intervals from diskettes sent from the vendor's central office or by downloading through an e-mail or file transfer connection to the central office. In all cases, the Revision Control procedure checks the current version of the program used by the terminal and guides the user through the updating procedure to update the local program to the most current revision.

Figure 4:
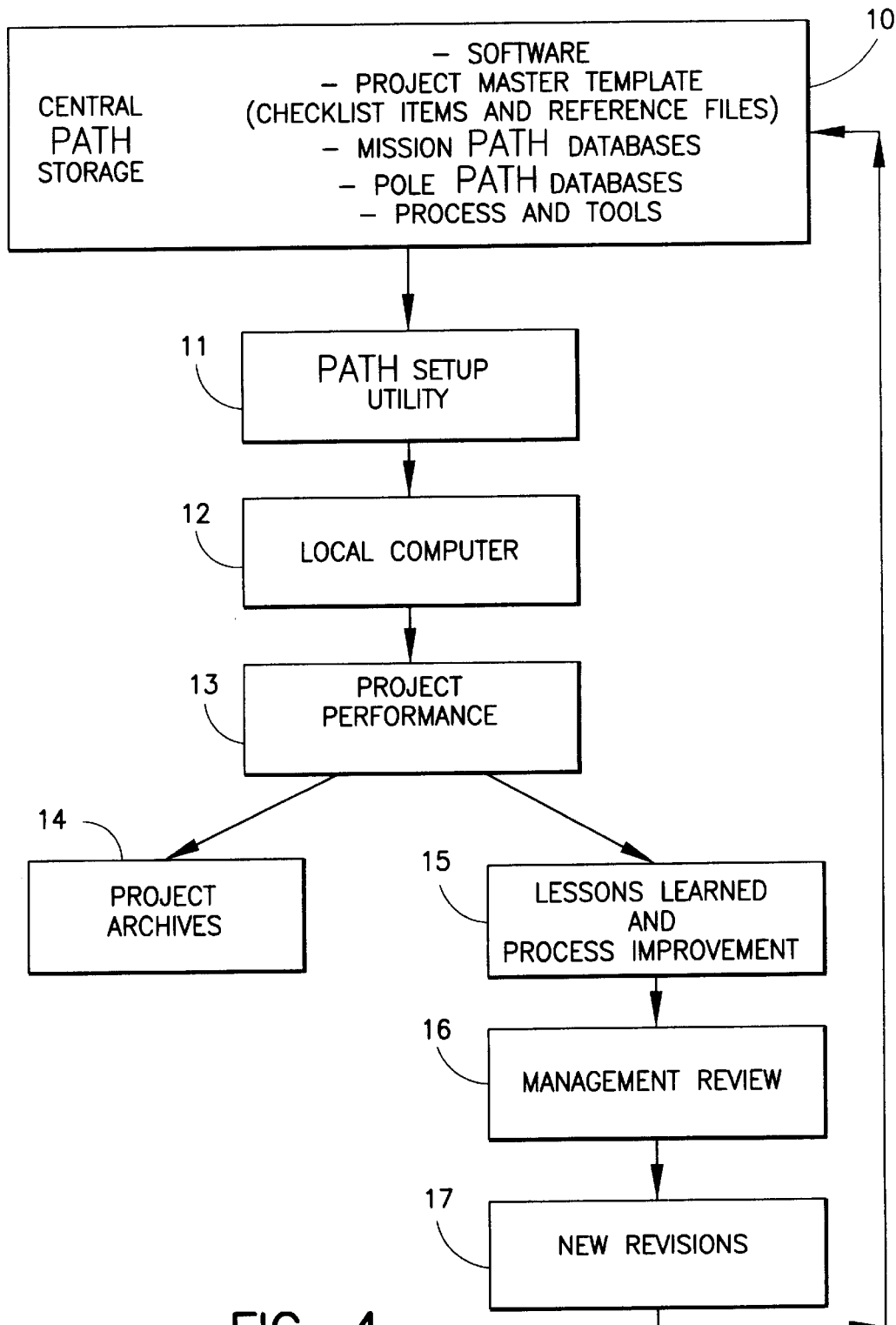
FIG. 4 is a data flow diagram illustrating a Revision Control procedure for updating the project management program at local sites.

FIG. 4 illustrates the basic data flow for a Revision Control procedure implemented in this example of the PATH program for a project services vendor. For the purpose of Revision Control, PATH is broken into components and each component is tracked by a separate version number. The major components being the PATH software, PATH Master Templates (which stores checklist items and reference files), Mission PATH Databases (which stores reference files), Pole PATH Databases (also stores reference files), and Processes & Tools (each Process or Tool is designated as a separate component). In the following description, numbers in parentheses are used in the diagram to reference the sequence of steps of the Revision Control procedure.

All current revisions of each PATH program component are stored in the global database, labelled in the diagram as Central PATH Storage (10). A PATH Setup Utility (11), when ran in Install mode, is used by each user to create a current site-specific version of PATH on their local computer from a current master version stored locally on a hard disk or available through a network to the central server. The site-specific installation includes only the components requested by the user for that particular site.

The PATH Setup Utility (11), when ran in an Update mode, will poll the user's Local Computer (12), and automatically detect old versions of any PATH component as compared to the current master version. The user may select which PATH components to update to the most current version.

An example of the Setup/Update utility for updating the project management program is illustrated via the pre-formatted screen display shown FIG. 5. Each PATH component is listed on the screen. Each component has a "Status." The status will set to "Installed" if the component is installed on the local computer (12), and is current. "OLD" means the component is an old revision. A blank status indicates the component is not installed on the local computer (12). The "Install", "Update" and "Remove" check boxes are used to select an action. The "Install" check box is used to install new components that do not already exist on the local computer (12). The "Update" check box is used to update an existing component on the local computer (12) that is out of date. The "Remove" check box will remove an existing component from the local computer (12). Each component also displays a description, current revision number, date of current revision and disk space installation requirements.

Projects are performed (13) on the local computer (12), in the home office or field at the local site. As mentioned previously, project management tasks are performed in the PATH program example, primarily by list management. The local computer may be disconnected from the Central PATH Storage (10) such as when the site project manager or members of the project team use a portable computer while on site.

After the project is performed, or at periodic intervals while a project of long duration is being performed, the site-specific project data (checklists and project files) are exported to the central server of the project services vendor. At the central server, the site-specific project data is stored in Project Archives (14). The Project Archives thus include complete histories of all projects that have been performed through the stored copies of the projects' programs and data files. For reviewing data from former projects or modelling new projects, the central office's project supervisors or mission review group or any site manager can access the old projects for information to use in new projects.

As a result of performance of a project or report from an on-going project, any valuable Lessons Learned and Process Improvements are transmitted back to central office (10) as part of the dynamic process in the invention of sharing the best practices learned locally with all other projects globally. The PATH program includes a pre-formatted utility for reporting Lessons Learned. A sample of the screen display for the Lesson Learned reporting utility is shown in FIG. 6. A project team may also report general comments through a pre-formatted utility for PATH Feedback. A sample of the screen display for the PATH Feedback reporting utility is shown in FIG. 7. This feedback includes both software improvements and reference file or content improvements.

The central office management staff collects and reviews all such feedback (16). From the feedback, new revisions of one or more PATH components may be created (17), and new revision numbers are then assigned to these components, which are then transmitted and stored in the Central PATH Storage (10). Thus, when the Central PATH Storage is next accessed for a new project or to update an on-going project, the new information approved by the management staff is made available in the now current version of the project files.

The Export Project feature of the PATH program operates by extracting project data from the local terminal PATH database into a temporary database. The temporary database and all project specific files are compressed into one file (using PKWare File Compression Software). This one file can be transferred to other users. The Import Project feature operates by uncompressing the exported file and storing the project data in the local terminal PATH database, and storing the project specific files into the PATH file storage scheme.

On the PATH Feedback screen, the user sends in this data to a central location which accumulates and stores all the questions and concerns by category of PATH. The user has the option of including anyone else on the distribution of the data by simply clicking on the address portion Everything is automatic and requires no prior knowledge of the MAIL system. Access to all questions/comments sent are readily retrievable to users having access to the central database.

The Lessons Learned Data sheet is provided to the selected mission review groups and business managers so that new best practices can be incorporated for future projects of a similar type. This standard structure makes it easy to compare the various projects and to maintain a database of experience which is useful to later project teams.

Combine Function

When an updated version of the project management program is installed at a local computer still running the previous version of the program, such as when an on-going project receives updated information, the new information is merged with the existing project files using a Combine function. The Combine function combines the two sets of project data together to form an updated or new version of the project data. The new project data is a basically a merge of checklist items, attachments and project files from both project data sets.

The Combine function utilizes a "subject code" that is assigned to each checklist item. Checklist items that come from the master files or templates of the Central PATH storage are assigned an indentifiable series code. Project-specific checklist items, i.e., items generated locally reflecting local information, may have a different series code or no subject codes. Where two checklist items are similar or equivalent, but appear in different master templates or different versions of the same master template, the Combine function assigns the merged item the same master subject code. Where a checklist item has a project-specific or no subject code, it is carried over to the merged list.

When an existing project is to be updated with a new version of a master program or templates, the Combine function is used to update the local project by treating the existing project lists as one project and the updated master templates as another project. This allows any site-specific information at the local project to be carried over into the updated program along with the new task lists from the updated master templates.

Figure 8:
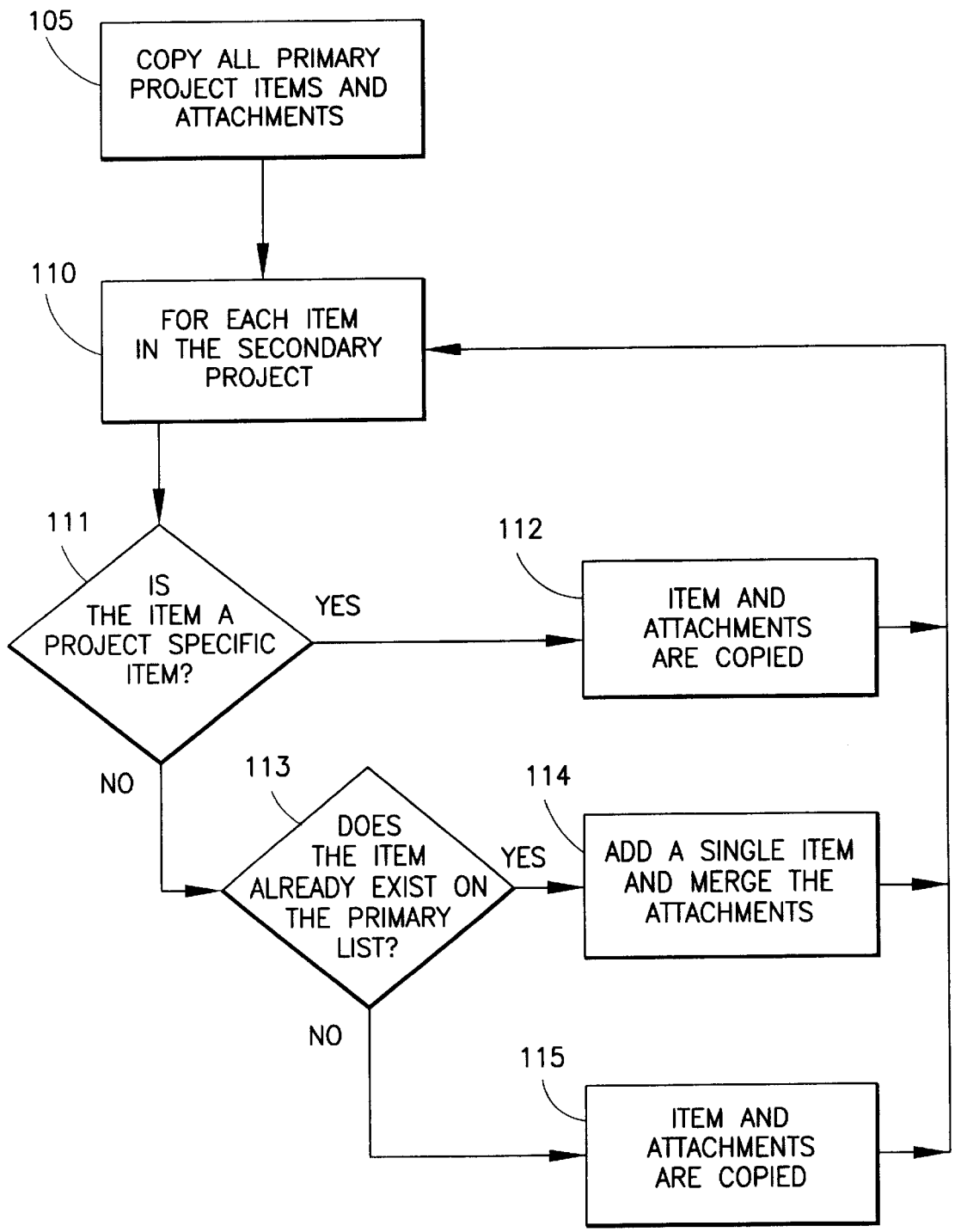
FIG. 8 is a logic diagram for a Combine function for merging task lists from two project files.

Referring to the flow diagram in FIG. 8, the Combine function works as follows. The numbers in parentheses are used in the diagram to reference the sequence of steps of the procedure. First, all primary project items and attachments are copied to the combined list (105). Then each item in the secondary project is checked (110), to determine whether the item is a project specific item (in which case a subject code is not assigned) (111). If so, the item and attachments are copied to the combined list (112). If the item is not a project specific item and originated from a master template, then the subject code for the item is checked to see if the item already exists from the primary list (113). If so, only a single item is maintained on the combined list and the attachments from both items are merged for the combined list (114). If the item is not in common with the primary items copied on the combined list (has a different subject code), then the item and attachments are copied to the combined list (115).

The following example demonstrates the application of the Combine function to merge a specified task list of a Project A with a corresponding list from a Project B to obtain an updated Project C:

| Project A | | |
|---|---|---|
| # Item Subject Code | | |
| 1. | Create Schedule. | 101 |
| 2. | Create Budgets. | 102 |
| 3. | Write Quality Plan. | 103 |
| 4. | Collect Design Record Files. | 0 (project specific) |
| Project B | | |
| # Item Subject Code | | |
| 1. | Create Schedule. | 101 |
| 2. | Create Budgets. | 102 |
| 3. | Plan Teamwork & Leadership. | 249 |
| 4. | Approve Budgets. | 0 (project specific) |

-continued

Project C (Combination of Project A and Project B)

| # | Item | Subject Code |
|---|---|---|
| 1. | Create Schedule. | 101 |
| 2. | Create Budgets. | 102 |
| 3. | Write Quality Plan. | 103 |
| 4. | Plan Teamwork & Leadership. | 249 |
| 5. | Collect Design Record Files. | 0 (project specific) |
| 6. | Approve Budgets. | 0 (project specific) |

In summary, the overall architecture for the project management system of the invention allows the new best information obtained locally to be exported to the central server of the services vendor where it is reviewed and can be shared globally with all projects of similar type. The Revision Control procedure ensures that the new best current information is installed at the local projects when a new project is initiated or when an on-going project is updated. The local project management program uses the Combine function to merge the new information with the existing project information to update the local project task lists. The system uses a common project management program and common-format files to facilitate the project updating and information sharing.

Although the invention has been described with reference to a preferred implementation, it will be appreciated that many other applications, variations and modifications thereof may be devised in accordance with the principles disclosed herein. The claimed aspects of the invention, including all such applications, variations and modifications deemed to be within the scope and spirit thereof, are defined in the following claims.

We claim:

1. A system for managing multiple projects of a similar type comprising:
   (a) a global project management database for storing data for all projects participating in said system, said database being maintained and updated dynamically with best current data representing best current practices across all participating projects in said system;
   (b) a plurality of localized computer terminals, each having a microprocessor for executing a project management program for a participating project associated with each said terminal at a respective local site and a memory for storing and retrieving data obtained from said global project management database for use in the project management program at the respective local site;
   (c) data access means operative between said global project management database and each one of the localized computer terminals for periodically importing data from said global project management database, including best current data across all projects, for use in the participating projects, and for periodically exporting data from the participating projects to said global project management database; and
   (d) updating means operative in conjunction with said global project management database for allowing evaluation of said data periodically exported from the localized computer terminals of the participating projects, determining whether any such data constitutes best current practices across all participating projects, and updating the best current data of said global project management database with data determined to constitute new best current practices across all participating projects, said new best current practices data then being imported by the localized computer terminals from said global project management database, wherein said updating means and said data access means are operative to update the localized computer terminals with the new best current practices data whenever a current version of data maintained at a localized computer terminal is outdated as compared to the new best current practices data available from said global project management database, whereby said global project management database is updated dynamically with best current data representing new best current practices across all participating projects of said system, and the localized computer terminals import and use the new best current practices at the respective participating projects.

2. The system as described in claim 1, wherein said data access means comprises means for importing and exporting data by periodic exchange of data stored on data storage media between said localized computer terminals and said global project management database.

3. The system as described in claim 1, wherein said data access means comprises a network connecting each of said localized computer terminals with said global project management database for importing and exporting data periodically therebetween.

4. The system as described in claim 1, wherein said project management program used by the localized computer terminals includes means for reporting lessons learned or best current practices developed at a participating project to said global project management database.

5. The system as described in claim 1, wherein the project management program used by the localized computer terminals is the same as that maintained with the global project management database, and a uniform directory and file structure is used by the common project management program.

6. A system for managing multiple projects of a similar type comprising:
   (a) a global project management database for storing data for all projects participating in said system, said database being maintained and updated dynamically with best current data representing best current practices across all participating projects in said system;
   (b) a plurality of localized computer terminals, each having a microprocessor for executing a project management program for a participating project associated with each said terminal at a respective local site and a memory for storing and retrieving data obtained from said global project management database for use in the project management program at the respective local site;
   (c) data access means operative between said global project management database and each one of the localized computer terminals for periodically importing data from said global project management database, including best current data across all projects, for use in the participating projects, and for periodically exporting data from the participating projects to said global project management database; and
   (d) updating means operative in conjunction with said global project management database for allowing evaluation of said data periodically exported from the localized computer terminals of the participating projects, determining whether any such data constitutes best current practices across all participating projects, and updating the best current data of said global project management database with data determined to constitute new best current practices across all participating projects, said new best current practices then being imported by the localized computer terminals from said global project management database, whereby said global project management database is updated dynamically with best current data representing new best current practices across all Participating projects of said system, and the localized computer terminals import and use the new best current practices at the respective participating projects, and wherein the project management program includes means for using the data obtained from said global project management database in a Project Planning Mode, then transferring the data from the Project Planning Mode for use in a Project Performance Mode.

7. A system for managing multiple projects of a similar type comprising:

(a) a global project management database for storing data for all projects participating in said system, said database being maintained and updated dynamically with best current data representing best current practices across all participating projects in said system;

(b) a plurality of localized computer terminals, each having a microprocessor for executing a project management program for a participating project associated with each said terminal at a respective local site and a memory for storing and retrieving data obtained from said global project management database for use in the project management program at the respective local site;

(c) data access means operative between said global project management database and each one of the localized computer terminals for periodically importing data from said global project management database, including best current data across all projects, for use in the participating projects, and for periodically exporting data from the participating projects to said global project management database; and (d) updating means operative in conjunction with said global project management database for allowing evaluation of said data periodically exported from the localized computer terminals of the participating projects, determining whether any such data constitutes best current practices across all participating projects, and updating the best current data of said global project management database with data determined to constitute new best current practices across all participating projects, said new best current practices then being imported by the localized computer terminals from said global project management database, whereby said global project management database is updated dynamically with best current data representing new best current practices across all participating projects of said system, and the localized computer terminals import and use the new best current practices at the respective participating projects, and wherein said data access means includes means for performing revision control by comparing an existing revision number of the project management program at a localized computer terminal with a revision number assigned to best current data currently imported from the global project management database.

8. The system as described in claim 7, wherein said means for performing revision control includes Combine means for combining new best current data currently imported from the global project management database with best current data maintained at the localized computer terminal for a participating project.

9. The system as described in claim 8, wherein said Combine means includes means for creating a combined list of best current data items by first copying best current data items for the participating project to the combined list, then comparing each new best current data item imported from the global project management database for inclusion on the combined list.

10. The system as described in claim 9, wherein each best current data item imported from the global project management database has a unique identifying code so that it is distinguishable from best current data items that are entered at the localized computer terminal as project specific items, and said Combine means operates to merge best current data items having unique identifying codes and copying best current data items not having unique identifying codes.

11. A method for managing multiple projects of a similar type comprising the steps of:

(a) maintaining a global project management database for storing data for multiple participating projects, said database being maintained and updated dynamically with best current data representing best current practices across all participating projects;

(b) providing a plurality of localized computer terminals, each having a microprocessor for executing a project management program for a participating project associated with each said terminal at a respective local site and a memory for storing and retrieving data obtained from said global project management database for use in the project management program at the respective local site;

(c) periodically importing data to each one of the localized computer terminals from said global project management database, including best current data across all projects, for use in the participating projects, and periodically exporting data from the participating projects to said global project management database; and (d) evaluating said data periodically exported from the localized computer terminals of the participating projects, determining whether any such data constitutes best current practices across all participating projects, and updating the best current data of said global project management database with data determined to constitute new best current practices across all participating projects, said new best current practices data then being imported by the localized computer terminals from said global project management database whenever a current version of data maintained at a localized computer terminal is outdated as compared to the new best current practices data available from said global project management database, whereby said global project management database is updated dynamically with best current data representing new best current practices across all participating projects, and the localized computer terminals import and use the new best current practices at the respective participating projects.

12. The method as described in claim 11, wherein said importing and exporting of data is conducted by periodic exchange of data stored on data storage media between said localized computer terminals and said global project management database.

13. The method as described in claim 11, wherein said importing and exporting of data is conducted periodically by connection to a network connecting each of said localized computer terminals with said global project management database.

14. The method as described in claim 11, wherein said periodic exporting data step includes reporting lessons learned or best current practices developed at a participating project to said global project management database.

15. The method as described in claim 11, wherein said program providing step includes providing the localized computer terminals with a common project management program having a uniform directory and file structure as maintained with the global project management database.

16. The method as described in claim 11, wherein said importing data step includes using the data obtained from said global project management database in a Project Planning Mode, then transferring the data from the Project Planning Mode for use in a Project Performance Mode.

17. The method as described in claim 11, wherein said importing data step includes performing revision control by comparing an existing revision number of the project management program at a localized computer terminal with a revision number assigned to best current data currently imported from the global project management database.

18. The method as described in claim 17, wherein said step of performing revision control includes combining new best current data currently imported from the global project management database with best current data maintained at the localized computer terminal for a participating project.

19. The method as described in claim 18, wherein said combining step includes creating a combined list of best current data items by first copying best current data items for the participating project to the combined list, then comparing each new best current data item imported from the global project management database for inclusion on the combined list.

20. The method as described in claim 19, wherein importing data step includes assignment of a unique identifying code to each best current data item imported from the global project management database so that it is distinguishable from best current data items that are entered at the localized computer terminal as project specific items, and merging together best current data items having unique identifying codes and copying best current data items not having said unique identifying codes.

* * * * *